Dec. 7, 1965 TSUNG-HSIEN CHENG 3,222,544

SUPERCONDUCTIVE, VARIABLE INDUCTANCE LOGIC CIRCUIT

Filed May 25, 1962 3 Sheets-Sheet 1

INVENTOR
TSUNG-HSIEN CHENG

BY Elmer Galbiati

ATTORNEY

United States Patent Office 3,222,544
Patented Dec. 7, 1965

3,222,544

SUPERCONDUCTIVE, VARIABLE INDUCTANCE LOGIC CIRCUIT

Tsung-Hsien Cheng, Croton-on-Hudson, N.Y., assignor to International Business Machines Corporation, New York, N.Y., a corporation of New York Filed May 25, 1962, Ser. No. 197,774
5 Claims. (Cl. 307—88.5)

This invention relates to electrical circuitry and more particularly to superconductive circuitry.

It is known that if a current is applied to a superconducting circuit which has two or more parallel branches, the current in the branches divides in inverse proportion to the inductance of the branches. Furthermore, it is known that if a conductor is in the vicinity of a segment of material which has superconductive and resistive states, the inductance of the conductor changes when the segment of material changes between the resistive and the superconductive states.

The present invention relates to logical circuitry which includes elements, the inductance of which is variable. Each logical circuit of the present invention has two parallel superconductive branches. The first branch has one or more variable inductance elements connected in series therewith and logical input signals are used to change the inductance of these variable inductance elements. As the inductance is changing a voltage is generated which changes the amount of current flowing in the second branch and this change in current is used as an output signal.

The logical circuitry of the present invention utilizes the fact that when the inductance of an element is changing or when the mutual inductance between two elements is changing, there is a voltage generated due to this change. By having a superconductive path in parallel with the element, the inductance of which is changed, the voltage generated due to the changing inductance or due to the changing mutual inductance can be advantageously utilized as an output signal.

An object of the present invention is to provide an improved superconducting circuit.

Another object of the present invention is to provide improved superconducting logical circuitry.

Another object of the present invention is to provide an improved superconductive threshold device.

Another object of the present invention is to provide a superconductive circuit which is the equivalent of a diode.

Still another object of the invention is to provide superconductive logical circuitry which is easy to fabricate.

Yet another object of the present invention is to provide superconductive logical circuitry which dissipates very little power during its operation.

The foregoing and other objects, features and advantages of the invention will be apparent from the following more particular description of preferred embodiments of the invention, as illustrated in the accompanying drawings.

Figure 1:
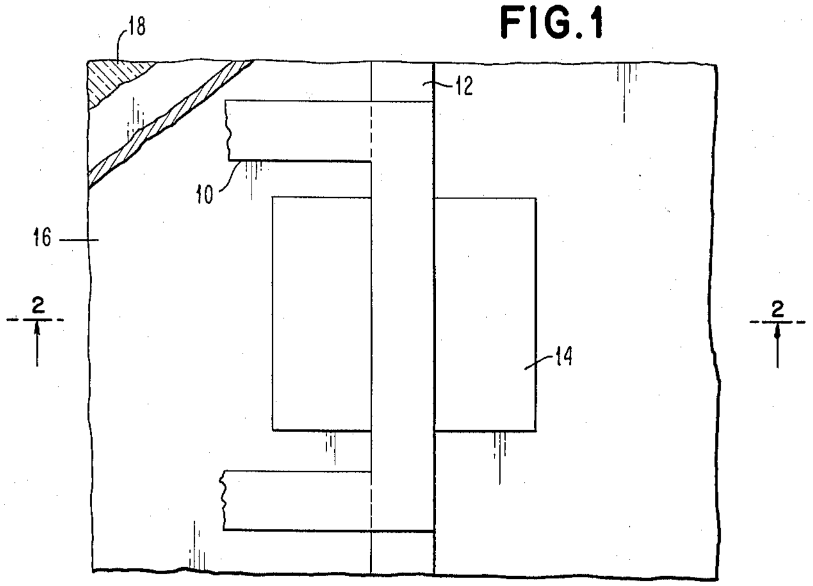
FIGURE 1 is a top view of a device which can vary the inductance of a conductor.
Figure 2:
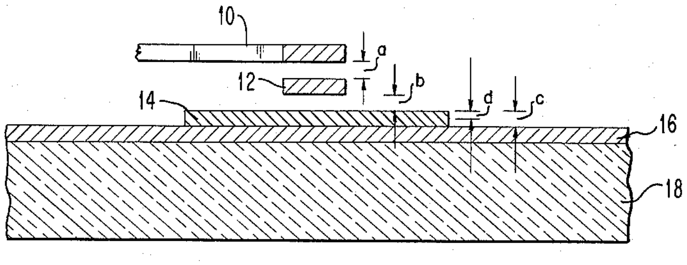
FIGURE 2 is a side view taken along line 2—2 in FIGURE 1.

FIGURE 1 is a top view and FIGURE 2 is a side view of the physical structure of a variable inductance element. The variable inductance element includes two superconducting conductors 10 and 12 positioned above a substrate 18. The substrate 18 is covered with a superconducting shield 16 and a segment of soft superconducting material 14 is positioned between the superconducting shield 16 and the conductor 12. Element 14 can be switched from the superconducting to the resistive state by the magnetic field generated by current in conductors 10 or 12 and, hence, it is hereinafter sometimes referred to as a switching element. Conductors 10 and 12 and superconducting shield 16 are each made of a "hard" superconducting material. That is, they are made from a material which never becomes resistive in the environment where the device is operated. Switching element 14 is made of a "soft" superconductive material and it can be changed from the superconducting to the resistive states by the magnetic field generated by current in conductors 10 or 12.

Conductor 10 is separated from conductor 12 and conductor 12 is separated from the switching element 14 and from the ground plane 16 by electrical insulating material. For clarity of illustration the insulating material is not shown in FIGURES 1 and 2. Since such material is well known, no description thereof is given herein.

In FIGURE 2, the distance between the bottom of conductor 10 and the top of conductor 12 is designated "$a$," the distance between the bottom of conductor 12 and the top surface of the switching element 14 is designated "$b$," and the thickness of the switching element 14 is designated "$c$." When switching element 14 is in the superconducting state, the self-inductance of each of the conductors 10 and 12 and the mutual inductance between conductors 10 and 12 is dependent upon the magnitude of the distances $a$ and $b$. This is well known and it is explained among other places in a publication by Norman A. Myers; in the November 1961 issue of the Proceedings of the IRE.

If switching element 14 is in the resistive state the self-inductance of conductors 10 and 12 and the mutual inductance between conductors 10 and 12 is also dependent upon the magnitude of thickness $c$. If a top portion of switching element 14 is resistive and a bottom portion of switching element 14 is superconductive, the self-inductance of conductors 10 and 12 and the mutal inductance between conductors 10 and 12 is dependent upon the thickness of that portion of switching element 14 which is resistive. The magnitude of the variable thickness of switching element 14 which is resistive at any particular time is designated "$d$."

If current is applied to conductor 10, the mutual inductance between conductor 10 and 12 induces a current in conductor 12. The direction of the current in conductor 12 is opposite to the direction of current in conductor 10 and the magnitude of the current in conductor 12 is dependent upon the magnitude of the current in conductor 10, the magnitude of the mutual inductance between conductors 10 and 12 and upon the magnitude of the inductance in other portions of the circuit in which conductor 12 is connected. An analysis of how current in conductor 10 induces a current in conductor 12 through the medium of the mutual inductance is given in copending application Serial No. 132,961 by R. L. Garwin, entitled, "Transformer," filed on August 21, 1961, and assigned to the assignee of the present invention (IBM Docket No. 10,397).

Current in conductor 10 generates a magnetic field which is incident upon switching element 14. As is well known, if sufficient current flows in conductor 10, that portion of element 14 which is beneath conductor 10 can be changed from a superconductive to a resistive state. When element 14 changes from a superconductive state to a resistive state the inductance of conductor 12 is changed. If an increasing amount of current is applied to conductor 10 (beginning with an amount of current which does not change any portion of element 14 from a superconducting state to a resistive state) when the current in conductor 10 reaches a certain value, herein designated as $I_c$, the topmost layer of element 14 will change from the superconductive state to the resistive state. If the current in conductor 10 is maintained at $I_c$ the thickness of the layer of element 14 which is resistive increases until finally the entire element 14 will be in the resistive state. That is, thickness $d$ (that portion of element 14 which is resistive at any particular time), increases from zero to $c$ if the current in conductor 10 is held at $I_c$. The self-inductance of conductors 10 and 12 and the mutual inductance between conductors 10 and 12 are proportional to the distance $d$, hence, as $d$ increases from zero to $c$ the mutual inductance between conductors 10 and 12 increases. As will be seen later as the mutual inductance changes a voltage is generated which is used to produce an output signal.

In a normal transformer, the electromotive force induced in the secondary is usually expressed as $$E=M\frac{di}{dt}$$

The equation is usually written in this form because the mutual inductance M is generally constant. However, in a more general form the equation can be written:

$$E=\frac{d(Mi)}{dt}$$

If both M and $i$ are variable the equation becomes:

$$E=M\frac{di}{dt}+i\frac{dM}{dt}$$

The present invention is directed to circuitry which utilizes the electromotive force generated due to the change in mutual inductance, that is the electromotive force indicated by the term $$i\frac{dM}{dt}$$

in the above equation. As will be seen later there is also an electromotive force generated due to the change in the self-inductance of the conductors and this can be used like the electromotive force generated due to the change in mutual inductance. The circuitry of the present invention will now be explained.

Figure 3:
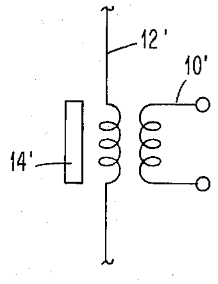
FIGURE 3 is a schematic circuit diagram used to represent the variable inductance element shown in FIGURES 1 and 2.
Figure 4:
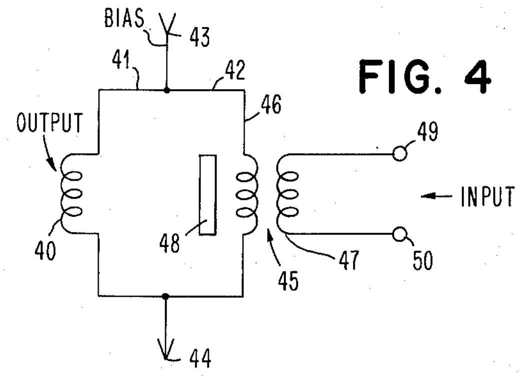
FIGURE 4 is a schematically shown circuit diagram of a simple threshold circuit.
Figure 5:
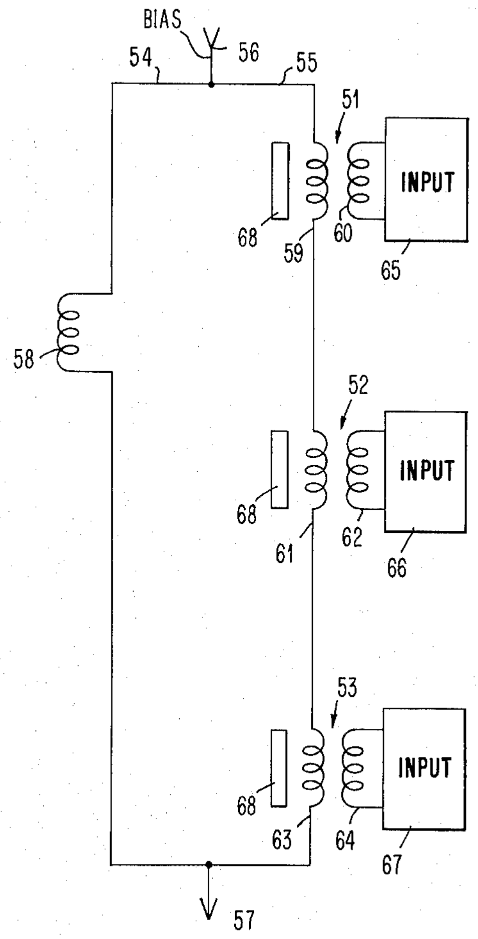
FIGURE 5 is a schematic circuit diagram of a representative logical circuit.
Figure 6:
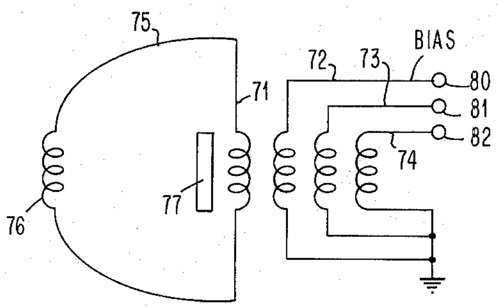
FIGURE 6 is a first alternate embodiment.

In the circuits of FIGURES 4, 5, 6 and 7, a symbol is used to represent structure similar to that shown in FIGURES 1 and 2. The symbol is shown in FIGURE 3. To show the correspondence between FIGURE 3 and FIGURES 1 and 2, the elements in FIGURE 3 are designated by the same designations as the elements in FIGURES 1 and 2. However, the designations of FIGURE 3 are followed by a prime. Conductor 10′ in FIGURE 3 represents conductor 10 in FIGURES 1 and 2 and likewise conductor 12′ represents conductor 12, and switching element 14′ represents switching element 14. In the symbolic representation of FIGURE 3 the substrate and the shield are not shown; however, it is understood that they are present. As will be seen later the devices of the present invention may have more or less than two conductors positioned above a switching element such as switching element 14. One of these structures is schematically represented as shown in FIGURE 6. The symbol shown in FIGURE 6 represents a structure with four conductors 71, 72, 73 and 74 positioned above a switching element 77.

The manner in which the circuits of the present invention operate will first be explained with reference to the simplified circuit shown in FIGURE 4. The circuit shown in FIGURE 4 only includes one variable inductance device 45. The circuit shown in FIGURE 4 has two parallel current paths designated 41 and 42 connected between a current source 43 and a current collecting means 44. The variable inductance device 45 includes conductors 46 and 47. Conductor 46 is connected in series with current path 42 and a conductor 47 is connected between two input terminals 49 and 50. Conductors 46 and 47 are positioned in the vicinity of switching element 48 which corresponds to switching element 14 in FIGURE 1. An output conductor 40 (which may be the input conductor of another similar device) is connected in series with current path 41.

In the following discussion the current through a conductor is indicated by an "I" with a subscript to indicate the particular conductor and the inductance of a conductor or of a current path is indicated by an "L" followed by a subscript to indicate the particular conductor or current path. For example $I_{47}$ indicates the current in conductor 47 and $L_{46}$ indicates the inductance of conductor 46. The mutual inductance between conductors 46 and 47 is indicated by an "M."

The current applied between current source 43 and current collecting means 44 flows in current paths 41 and 42. When no current is flowing between terminal 49 and 50 the relative magnitude of $I_{41}$ and $I_{42}$ is determined by the relative magnitude of $L_{41}$ and $L_{42}$. Sufficient current is applied between current source 43 and current collecting means 44 so that with no current applied between terminals 49 and 50 the magnitude of $I_{42}$ is just slightly below the amount of current needed to change any portion of switching element 48 from the superconductive state to the resistive state.

Figure 8A:
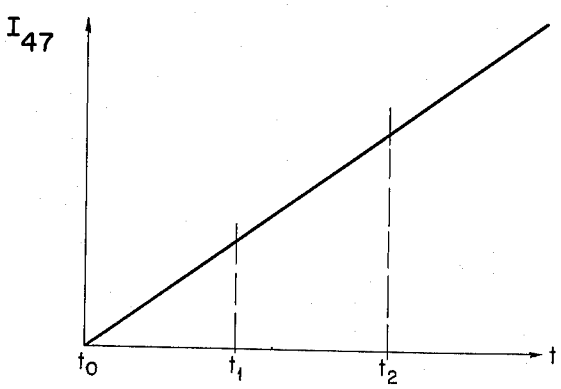
FIGURES 8A, 8B, 8C and 8D are graphs showing the amount of current with respect to time.
Figure 8B:
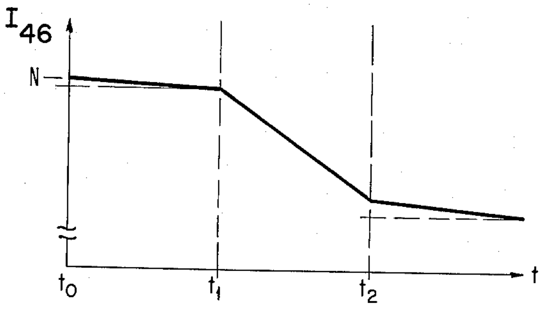
Figure 8C:
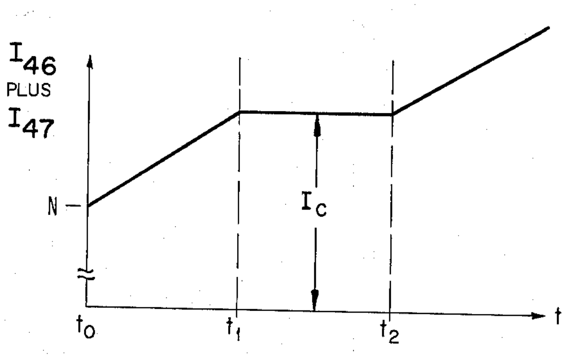
Figure 8D:
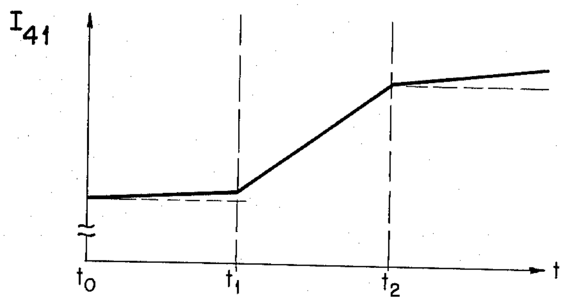

FIGURES 8A, 8B, 8C and 8D show in graphical form the relationhip between current and time in the various conductors during the operation of the device shown in FIGURE 4. FIGURE 8A shows the magnitude of the current in conductor 47. The current in conductor 47 is the signal which activates the device. FIGURE 8B shows the magnitude of the current in conductor 46. Since conductor 46 is in series current path 42, the magnitude of the current in conductor 46 is the same as the magnitude of the current in current path 42. FIGURE 8C shows the magnitude of the sum of the currents in conductors 46 and 47 and FIGURE 8D shows the magnitude of the current and current path 41 (and in output 40).

It should be noted that for convenience of illustration FIGURES 8B, 8C and 8D do not show the entire vertical axis. The reason for this is that the magnitude of each current is over ten times as large as the total change which each current experiences and it is the change in the value of each current in which we are interested. Sample values for the various currents are given later.

Initially before an input signal is applied to conductor 47, the current from current source 43 divides between current path 41 and 42 in inverse proportion to the inductance of these paths, the current initially flowing in current path 42 and in conductor 46 (designated N in FIGURES 8B and 8C) is not sufficient to make any portion of switching element 48 resistive. As previously explained, either the magnetic field generated by current flowing in conductor 46 or the magnetic field generated by current flowing in conductor 47 can make element 48 resistive. Current in either of the two conductors is equally as effective in switching element 48 from the superconductive state to the resistive state. Hence, it can be stated that switching element 48 will be changed from the superconductive state to the resistive state when the algebraic sum of the current in conductors 46 and 47 exceeds a certain amount. The amount of current needed in conductors 46 and 47 to make element 48 resistive is indicated as $I_c$ in FIGURE 8C. $I_c$ will hereinafter be referred to as the critical current. When the algebraic sum of the currents in conductors 46 and 47 is greater than $I_c$, element 48 is resistive and when the algebraic sum of the currents in conductors 46 and 47 is less than $I_c$, element 48 is superconductive.

When a current signal having a magnitude with respect to time as shown in FIGURE 8A is applied to conductor 47, the output signal in current path 41 is as indicated in FIGURE 8D. As shown in FIGURE 8C between times $t_0$ and $t_1$ the algebraic sum of the current in conductors 46 and 47 is below $I_c$. During this time the magnitude of the current in conductor 46 decreases slightly due to transformer action. That is, since there is mutual inductance between conductor 47 and conductor 46, and since the current in conductor 47 is increasing, the mutual inductance generates an electro-motive force in conductor 46 which tends to decrease the current in conductor 46. The electro-motive force generated in conductor 46 during the time $t_0$ to $t_1$ is given by the following expression:

$$E=M\frac{dI_{47}}{dt}$$

Since the electro-motive force referred to above tends to decrease the current in conductor 46, it naturally tends to increase the current in current path 41. This is shown in FIGURE 8D.

As shown in FIGURE 8A, between times $t_1$ and $t_2$ the current in conductor 47 continues to increase; however, if the sum of the current in conductors 46 and 47 continued to increase, the sum of the current in conductors 46 and 47 would increase beyond $I_c$ (FIGURE 8C). As the current in conductor 47 increases beyond its value at time $t_1$, the top-most layer of switching element 48 changes from the superconductive state ot the resistive state. When this top-most layer changes from the superconductive state to the resistive state, the self-inductance of conductor 47 and the mutual inductance between conductor 47 and conductor 46 changes and there is an electro-motive force generated in conductor 46 due to this change in self and mutual inductance. This electro-motive force is given by the following equation:

$$E=I_{46}\frac{dL_{46}}{dt}+I_{47}\frac{dM}{dt} \quad \text{(A)}$$

This electro-motive force tends to decrease the current in conductor 46. However, the current in conductor 46 does not decrease below an amount such that the sum of the currents in conductors 46 and 47 is below $I_c$ since it is the fact that this sum tended to increase beyond $I_c$ which generated the voltage in the first place. This results in a state of equilibrium whereby the sum of the current in conductors 46 and 47 is maintained at $I_c$. However, as $I_{47}$ increases more of switching element 48 is changed from the superconductive to the resistive state increases (thickness $d$ increases).

Finally at time $t_2$ all of element 48 is changed from the superconductive state to the resistive state, hence, there no longer is any voltage generated due to the change in mutual inductance. That is, there can be no longer any voltage such as that given by Equation A above and the sum of the current in conductors 46 and 47 increases beyond $I_c$. Thereafter the current in conductor 46 again decreases at the rate merely due to the mutual inductance between conductors 46 and 47.

Since the mutual inductance between conductors 46 and 47 is greater when element 48 is resistive then when element 48 is superconductive, beyond time $t_2$ the mutual inductance between conductor 46 and 47 is greater and hence, the slope of the curve in FIGURE 8B is greater beyond $t_2$ then it is between $t_0$ and $t_1$.

As the current in conductor 47 is decreased, each of the curves shown in FIGURES 8A, 8B, 8C and 8D is retraced. Hence, when the current in conductor 47 returns to ZERO, the circuit is in the same condition as before the current in conductor 47 was increased. It should be noted that the only reason that this is possible is that current path 41 (i.e., the current path which is in parallel with variable inductance element 45) is entirely and always superconducting.

As the current in conductor 47 is decreased, element 48 switches from the resistive to the superconducting state and the same electro-motive forces generated as element 48 changed from the superconductive to the resistive state are again generated, except that when the current in conductor 47 is decreasing these voltages are opposite in polarity to the electro-motive forces generated as the current in conductor 47 was increased. If the current path which is connected in parallel with conductor 46 were not always superconductive, the current which results from the electro-motive forces in conductor 46 would decay due to the resistance and a signal in conductor 47 would merely produce a pulse in output conductor 40 as the current in conductor 47 increased and a pulse in output conductor 40 as the current in conductor 47 decreased.

It should be noted that for convenience of illustration FIGURES 8B, 8C and 8D do not show the entire vertical axis. The reason for this is that the magnitude of the current in the conductors is many times greater than the magnitude of the change which the current experiences and it is the change in the current which is of interest. The magnitude of the current in conductors 46 and 47 is in the neighborhood of one and a half amps and the change in current is in the neighborhood of two tenths of an amp. For example, if the structure shown in FIGURES 1 and 2 has the following parameters:

| | |
|---|---|
| Thickness of conductors 10 and 12 ____angstroms | 8,000 |
| Distance between conductor distances (i.e., distances $a$ and $b$) ____do____ | 8,000 |
| Thickness of switching element 14 (i.e., distance $c$) ____do____ | 20,000 |
| Width of conductors 10 and 12 ____inch__ | 0.009 |
| Material from which switching element 14 is fabricated ____ | Indium |
| Material from which conductors 10 and 12 and shield 16 are fabricated ____ | Lead |
| Operating temperature, degrees Kelvin ____ | 3 |

the resulting critical current (i.e. $I_c$) is about 1.35 amps and the required working current (i.e., the magnitude of the change in $I_{47}$) is about 0.2 amp. Likewise, the change in the current in paths 41 and 42 is in the order of two tenths of an amp.

The fact that the device operates as a threshold device and switching element can be seen by examining FIGURE 8D which shows that the current in current path 41 (and therefore the current output conductor 40) increases very slight amounts between $t_0$ and $t_1$. After the device arrives at its threshold at time $t_1$, the current in conductor 41 increases at a much faster rate. The device operates as a switching element because variations in the input below a certain level cause practically no effect in the output; however, variations in the input beyond the threshold level cause relatively large changes in the output. The manner in which these devices can be interconnected to form logical circuits will now be explained. A more detailed mathematical analysis of how the circuit shown in FIGURE 4 operates is given later.

A three input logical OR circuit built with the variable inductance elements of the present invention is shown in FIGURE 5. The circuit includes two current paths 54 and 55 connected between a current source 56 and a current collecting means 57. The circuit also includes three variable inductance devices 51, 52 and 53 associated with current path 55 and an output conductor 58 connected in series with current path 54.

The variable inductance device 51 has two conductors 59 and 60 and an input means 65 connected to conductor 60, variable inductance device 52 has two conductors 61 and 62 and an input means 66 connected to conductor 62, and variable inductance device 53 has two conductors 63 and 64 and an input means 67 connected to conductor 64. Conductors 59, 61 and 63 are connected in series with current path 55 and each of the variable inductance devices 51, 52 and 53 has a switching element 68 which is equivalent to switching element 14 in FIGURE 1.

Similar to the manner in which the application of a signal to conductor 47 shifted current from current path 42 to 41 in the device shown in FIGURE 4, the application of a signal to either conductor 60, conductor 62 or conductor 64 will shift current from current path 55 to current path 54. Hence, the circuit is a logical OR circuit. An input on any one of the three conductors 60, 62 or 64 has the same effect, namely, shifting current from current path 55 to current path 54. If two inputs are simultaneously activated, the same amount of current is shifted as is shifted when only one input is activated, since the equilibrium condition for both input devices is satisfied by the same decrease in current. It should be noted, however, that the shift in current due to transformer action in the various inputs is cumulative. If transformer action, that is, $$M\frac{di}{dt}$$

were used to generate the output signal, the magnitude of the output signal would be dependent upon the number of inputs which were achieved. However, since the device of the present invention utilizes the voltage due to the change in the mutual (or self) inductance, this is not the case.

The output conductor 58 can be used as the input to another similar variable inductance logical circuit or the conductor 58 can be used as the control conductor for a conventional cryotron. In either event, an increasing amount of current in conductor 58 can manifest an output signal in another circuit.

In FIGURES 1 and 2 only two conductors 10 and 12 are shown positioned above the segment 14. Similar to the manner in which conductor 10 is positioned above conductor 12, a plurality of additional conductors can be positioned above conductor 10. Such a device is shown symbolically in FIGURE 6. In the device of FIGURE 6, four conductors 71, 72, 73 and 74 are positioned above a segment of material 77 which can be changed from the superconductive state to the resistive state by a magnetic field. Element 77 is similar to element 14 in FIGURE 1. As pointed out, where a plurality of conductors are positioned above a segment of material which can be changed from the superconductive to the resistive state by the application of magnetic field, current in any one of the conductors is equally effective to change the state of the segment of material. That is, the magnetic field generated by current in any one of the conductors 71 to 74 is equally effective to change the state of element 77. Hence, current in any one of the conductors 72 to 74 is equally effective to change the inductance of conductor 71. For this reason, the circuit shown in FIGURE 6 operates as a logical OR circuit. Current in any one of the conductors 72 to 74 can generate an electro-motive force in conductor 71.

The circuit shown in FIGURE 6 also illustrates another feature of the present invention. The circuits shown in FIGURES 4 and 5 each have two current paths connected between a current source and a current collecting means. For example, in FIGURE 4, two current paths 41 and 42 are connected between a current source 43 and a current collecting means 44. In the circuit shown in FIGURE 6, the circuit wherein conductor 71 is connected does not have a current source connected thereto. Instead, conductor 71 is merely connected to a superconducting current path 75 which has an output conductor 76 connected in series therewith. Conductor 72 is connected to a source of bias current (indicated by terminal 80) which generates a magnetic field, the magnitude of which is slightly below the amount of magnetic field needed to change any portion of gating element 77 resistive. The current flowing in conductor 72 therefore has the same effect as the current initially flowing between current source 43 and current collecting means 44 in the circuit shown in FIGURE 4. When current is applied to either conductor 73 or 74, and the magnitude of this current exceeds the threshold of the device, that is, when magnetic field generated by the current in either conductor 73 or 74 is sufficient to switch some portion of gating element 77 resistive, an electro-motive force is generated in conductor 71. This electro-motive force produces a current which circulates through the superconducting current path 75 and through the output conductor 76. In the circuits shown in FIGURES 4 and 5, the current sources connected to the loop circuits can be replaced by an additional conductor in each of the variable inductance elements. The additional conductor would be connected to a bias supply which supplies a current, the magnitude of which is just slightly below $I_c$.

Figure 7:
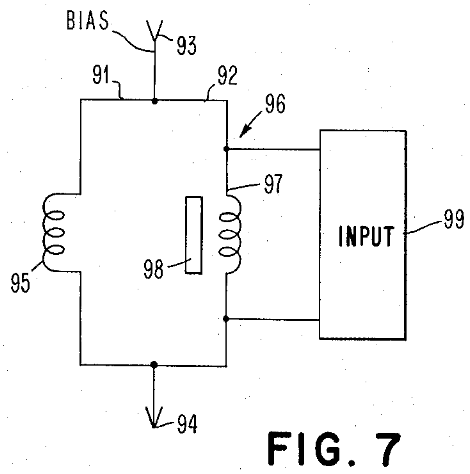
FIGURE 7 is a second alternate embodiment.

Another variation which is possible in the circuitry of the present invention is shown in FIGURE 7. The circuits described thus far have operated upon the principle that a voltage is generated due to the change of mutual inductance between a first conductor and a second conductor. It is also true that a voltage is generated in a single conductor when the inductance of the conductor is changed. That is, if current is passed through a conductor which is positioned over a segment of material which can be changed from the superconductive state to the resistive state by magnetic field, after the magnitude of the current in the conductor exceeds the amount of current necessary to change the top-most portion of the segment of material from the superconductive state to the resistive state, an electro-motive force is generated in the conductor due to the change in the inductance of the conductor itself. This electro-motive force can be expressed as follows:

$$E=I\frac{dL}{dt}$$

In the circuit shown in FIGURE 7, the input current is applied to the same conductor which is connected in parallel with the output conductor. The circuit in FIGURE 7 has two current paths 91 and 92 connected between the source of current 93 and a current collecting means 94. The current path 91 has an output conductor 95 connected in series therewith and current path 92 has variable inductance device 96 associated therewith. The variable inductance device 96 has a single conductor 97 and a segment of superconductive material 98 associated therewith. The conductor 97 is connected in series with current path 92 and an input 99 is connected across conductor 97. In the circuit shown in FIGURE 7, the inductance of conductor 97 is much smaller than the inductance of current path 91. Hence, except when element 98 is changing from the superconductive to the resistive state, current from input 99 mostly flows through conductor 97 rather than through output conductor 95.

As in the circuit of FIGURE 4, the bias current from source 93 is slightly below the amount needed to change any portion of element 98 to the resistive state. As the current from input 99 increases, the current through conductor 97 increases until it reaches $I_c$. Thereafter, the current through conductor 97 remains substantially constant as shown in FIGURE 8C. As the current from input 99 continues to increase, the increasing current flows through output conductor 95. The circuit shown in FIGURE 7, therefore, operates in a similar manner to the circuit shown in FIGURE 4. The circuit shown in FIGURE 7 has the advantage that the variable inductance device 96 has only one conductor; however, it has the disadvantage that the input 99 and the output 95 are not electrically isolated.

Another change which could be made in the circuit of FIGURE 7 is the elimination of the current source 93 and the current collecting means 94. In this event, the bias current would flow from input 99 and the signal would be superimposed upon the bias current.

The operation of the circuit shown in FIGURE 4 can be mathematically described as follows: Initially no current is flowing in conductor 47 and a certain amount of current is flowing in each of the paths 41 and 42 from current source 43. At this time, the current in path 42 is below $I_c$. When current in conductor 47 is increased (between $t_0$ and $t_1$ in FIGURE 8A), the current in conductor 46 decreases due to mutual inductance. During this time period all of element 48 is superconducting and there is no change in the inductance of conductor 46 or in the mutual inductance between conductors 46 and 47. The operation of the circuit during this time can be described by the following equation:

$$(1)\qquad L_{42}\frac{dI_{42}}{dt}+M\frac{dI_{47}}{dt}=L_{41}\frac{dI_{41}}{dt}$$

When considered over a period of time, this equation reduces to:

(Where the symbol $\Delta$ indicates an amount of change.)

$$(2)\qquad L_{42}\Delta I_{42}+M\Delta I_{47}=L_{41}\Delta I_{41}$$

Since bias source 43 supplies a constant current, the change in $I_{42}$ must equal the negative of the change in $I_{41}$ and the equation can be written as:

$$(3)\qquad M\Delta I_{47}=(L_{41}+L_{42})\Delta I_{41}$$

The quantity $(L_{41}+L_{42})$ is much larger than M since M is merely the mutual inductance between the conductors 46 and 47 and $(L_{41}+L_{42})$ includes all the inductance of both current paths 41 and 42. Hence, between $t_0$ and $t_1$ there is no significant change in $I_{41}$ and hence no significant change in the amount of current in output conductor 40.

When the total current in conductors 46 and 47 reaches $I_c$, the inductance and mutual inductance of the conductors begins to change. During the period between $t_1$ and $t_2$, the circuit can be described by the following equation:

$$(4)\qquad \frac{d[L_{42}I_{42}+MI_{47}]}{dt}=L_{42}\frac{dI_{41}}{dt}$$

The above equation can be written as follows:

$$(5)\qquad I_{42}\frac{dL_{42}}{dt}+L_{42}\frac{dI_{42}}{dt}+I_{47}\frac{dM}{dt}+M\frac{dI_{47}}{dt}=L_{41}\frac{dI_{47}}{dt}$$

As previously explained, the amount of current initially flowing in current path 42 from source 43 (the bias current) is much larger than the amount of current supplied to the input conductor 47 (the working current). That is, $I_{47}$ is much smaller than $I_{42}$. Furthermore, since both the change in $L_{42}$ and the change in M result from the change in the amount of element 48 which is resistive (the change in distance $d$ in FIGURE 2), the change in $L_{42}$ with respect to time is substantially equal to the change in M with respect to time. Therefore, the third term in the above equation can be combined with the first term and the equation can be written as:

$$(6)\qquad (I_{42}+I_{47})\frac{dL_{42}}{dt}+L_{42}\frac{dI_{42}}{dt}+M\frac{dI_{47}}{dt}=L_{41}\frac{dI_{47}}{dt}$$

Between $t_1$ and $t_2$ the sum of $I_{46}$ and $I_{47}$ equal $I_c$ (see FIGURE 8C), therefore the sum of $I_{42}$ and $I_{47}$ equals $I_c$. The above equation can be written as:

$$(7)\qquad I_c\frac{dL_{42}}{dt}+L_{42}\frac{dI_{42}}{dt}+M\frac{dI_{47}}{dt}=L_{41}\frac{dI_{41}}{dt}$$

When considered over a period of time, this equation reduces to:

$$(8)\qquad I_c\Delta L_{42}+L_{42}\Delta I_{42}+M\Delta I_{47}=L_{41}\Delta I_{41}$$

Since the change in $I_{42}$ must equal the negative of the change in $I_{41}$, the above equation can be written as:

$$(9)\qquad I_c\Delta L_{42}+M\Delta I_{47}=(L_{41}+L_{42})\Delta I_{41}$$

The second term in the above equation is the same as the term which appears in Equation 3 above and as previously explained, this term is small. $I_c$ is, however, relatively large and the change in $L_{42}$ is also relatively large, hence, the change in $I_{41}$ is relatively large during this period. Since $I_{41}$ experiences a relatively small change between $t_0$ and $t_1$, and it manifests a relatively large change between $t_1$ and $t_2$ we have a threshold device.

The change in $I_{41}$ generated due to the electro-motive force in conductor 46 continues to flow in current path 41 without decreasing because current path 41 is superconducting. When the current in conductor 47 is decreased an electro-motive force of opposite polarity is generated in conductor 46 and this causes a negative change in $I_{41}$. The result is that after the current in conductor 47 returns to zero the current in conductor 46 is back to its initial condition. It should be particularly noted that the only reason that the process is reversible is that the path which is in parallel with conductor 40 is entirely and always superconducting.

The amount of change experienced in the output is a function of geometry of the device. By increasing the length of the switching element (i.e. by changing the amount of material which is changed from the superconductive to a resistive state) the magnitude output can be changed.

The circuits shown in FIGURES 5, 6 and 7 can be analyzed in a manner similar to that above.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A logical circuit comprising,
a superconductive loop circuit having first and second superconductive current paths connected in parallel, means for establishing a bias current in said loop circuit,
said first current path having a plurality of superconductive conductors connected in series therewith,
a plurality of segments of soft superconductive material, one juxtaposed to each of said conductors, and
means adjacent to each segment of superconductive material for changing the associated segment of material from the superconductive state to the resistive state by the application of magnetic field,
whereby the bias current flowing in said second current path is increased by a certain amount when any one of said segments is changed from a superconductive state to a resistive state.

2. A cryogenic circuit comprising,
first and second superconductive current paths connected in parallel, means for establishing a bias current in both said paths, a variable inductance threshold device for controlling the current in said second path comprising,
a first superconductive conductor connected in series with said first current path, said conductor being made of hard superconductive material,
an input conductor, means for supplying current to said input conductor,
said input conductor having a small amount of mutual inductance with said first conductor, and
a segment of soft superconductive material located within the magnetic fields produced by said input and first conductors,
whereby current changes in said input conductor effect no appreciable changes in the current in said second current path so long as the current in said input conductor is below a certain threshold and whereby current changes in said input conductor effect an appreciable change in the magnitude of the current in said second current path when the current in said input conductor is above said threshold.

3. A superconducting circuit element comprising, a superconductive loop circuit including an output conductor and an input conductor connected in parallel, means for establishing a bias current in said loop circuit, a switching element comprising a segment of soft superconductive material located within the magnetic field generated by said input conductor whereby said magnetic field generated by current in said input conductor can switch said segment of superconductive material from the superconductive state to the resistive state, means for biasing said switching element to near the amount of magnetic field needed to switch said element from the superconductive state to the resistive state, and input means located in flux linking relationship to both said input conductor and said switching element for supplying magnetic field to change the state of said switching element, thereby changing the current in said output conductor.

4. A threshold device comprising, a superconductive loop circuit having an output conductor and a first input conductor connected in parallel, said conductors being formed of a hard superconductive material, a switching element comprising a segment of soft superconductive material located within the magnetic field generated by said first input conductor, said switching element being electrically isolated from either conductor, means for applying a biasing magnetic field to said segment of material, and a second input conductor located in flux linking relationship with said segment of material for applying a magnetic field thereto, to switch said segment of material from its superconductive to its resistive state.

5. A threshold device comprising a superconductive loop circuit having an output conductor and an input conductor connected in parallel, means for establishing a bias current in said loop, an electrically isolated switching element comprising a segment of soft superconductive material, said switching element being positioned near said input conductor, said switching element further having a threshold whereby a magnetic field above a certain value switches said element from the superconductive state to the resistive state, means for biasing said switching element to near its threshold, a plurality of conductors in the vicinity of said switching element, and a plurality of input means for supplying current to said plurality of conductors to control the current in said output conductor.

References Cited by the Examiner

UNITED STATES PATENTS

| | | | |
|---|---|---|---|
| 2,930,908 | 3/1960 | McKeon et al. | 307—88.5 |
| 3,065,359 | 11/1962 | Mackay | 307—88.5 |
| 3,021,434 | 2/1963 | Blumberg et al. | 307—88.5 |

ARTHUR GAUSS, *Primary Examiner.*